United States Patent
Jin et al.

(10) Patent No.: US 12,062,482 B2
(45) Date of Patent: Aug. 13, 2024

(54) POWER MODULE AND POWER CIRCUIT

(71) Applicant: Delta Electronics (Thailand) Public Company Limited, Samutprakarn (TH)

(72) Inventors: Feng Jin, Samutprakarn (TH); Lei Cai, Samutprakarn (TH); Kai Dong, Samutprakarn (TH); Zhong-Wei Ke, Samutprakarn (TH); Jin-Fa Zhang, Samutprakarn (TH)

(73) Assignee: Delta Electronics (Thailand) Public Company Limited, Samutprakarn (TH)

( * ) Notice: Subject to any disclaimer, the term of this patent is extended or adjusted under 35 U.S.C. 154(b) by 0 days.

(21) Appl. No.: 17/655,175

(22) Filed: Mar. 17, 2022

(65) Prior Publication Data
US 2022/0208440 A1    Jun. 30, 2022

Related U.S. Application Data

(62) Division of application No. 16/162,422, filed on Oct. 17, 2018, now Pat. No. 11,315,723.

(30) Foreign Application Priority Data

Oct. 20, 2017    (CN) .......................... 201710985310.7

(51) Int. Cl.
*H02M 3/33* (2006.01)
*H01F 27/24* (2006.01)
(Continued)

(52) U.S. Cl.
CPC ........... *H01F 27/306* (2013.01); *H01F 27/24* (2013.01); *H01F 27/38* (2013.01); *H01F 27/40* (2013.01);
(Continued)

(58) Field of Classification Search
CPC ........ H01F 27/306; H01F 27/24; H01F 27/38; H01F 27/40; H01F 27/292;
(Continued)

(56) References Cited

U.S. PATENT DOCUMENTS 5,959,842 A    9/1999    Leonard et al.
8,836,459 B1    9/2014    Hsu et al.
(Continued)

FOREIGN PATENT DOCUMENTS

CN    101997418 A    3/2011
CN    102158096 A    8/2011
(Continued)

*Primary Examiner* — Mang Tin Bik Lian
(74) *Attorney, Agent, or Firm* — CKC & Partners Co., LLC

(57) ABSTRACT

Power module includes transformer unit including primary and secondary windings and magnetic core; first and second capacitor units coupled to first terminal of primary winding of transformer unit through first node; first and second external pins respectively coupled to first terminal of first capacitor unit and second terminal of second capacitor unit; first and second switch units coupled to second terminal of primary winding of transformer unit thorough second node; third and fourth external pins respectively coupled to first terminal of first switch unit and second terminal of second switch unit; secondary-side circuit coupled to secondary winding; and fifth and sixth external pins electrically coupled to first and second output terminals of secondary-side circuit, respectively. First external pin is coupled to one of third and fourth external pins selectively.

10 Claims, 11 Drawing Sheets

(51) Int. Cl.
*H01F 27/30* (2006.01)
*H01F 27/38* (2006.01)
*H01F 27/40* (2006.01)
*H02M 3/335* (2006.01)
*H01F 27/29* (2006.01)

(52) U.S. Cl.
CPC ....... *H02M 3/33576* (2013.01); *H01F 27/292* (2013.01); *H01F 2027/297* (2013.01); *H01F 2027/408* (2013.01)

(58) Field of Classification Search
CPC ........ H01F 2027/297; H01F 2027/408; H02M 3/33576; H02M 1/0058; H02M 1/0074; H02M 3/285; H02M 3/33592
See application file for complete search history.

(56) References Cited

U.S. PATENT DOCUMENTS

| | | | |
|---|---|---|---|
| 2007/0076446 A1* | 4/2007 | Shiga | H02M 3/3376 363/17 |
| 2011/0007527 A1* | 1/2011 | Liu | H02M 3/33561 363/21.02 |
| 2011/0222246 A1 | 9/2011 | Hsieh et al. | |
| 2013/0063981 A1 | 3/2013 | Dujic et al. | |
| 2015/0103561 A1 | 4/2015 | Dai et al. | |
| 2015/0103564 A1* | 4/2015 | Duan | H02M 3/33571 363/21.02 |
| 2015/0109824 A1 | 4/2015 | Chen et al. | |
| 2015/0229216 A1* | 8/2015 | Kyono | H02M 3/3376 363/17 |
| 2015/0381060 A1 | 12/2015 | Eng et al. | |
| 2016/0094136 A1* | 3/2016 | Fu | H02M 3/33584 363/21.02 |
| 2017/0063251 A1* | 3/2017 | Ye | H02M 3/33576 |
| 2017/0288556 A1 | 10/2017 | Tang et al. | |
| 2018/0138815 A1* | 5/2018 | Yamada | H02M 3/07 |

FOREIGN PATENT DOCUMENTS

| | | |
|---|---|---|
| CN | 102983002 A | 3/2013 |
| CN | 103683955 A | 3/2014 |
| CN | 104753338 A | 7/2015 |
| CN | 105406717 A | 3/2016 |
| CN | 106712518 A | 5/2017 |

* cited by examiner

POWER MODULE AND POWER CIRCUIT

RELATED APPLICATIONS

This application is a divisional of U.S. application Ser. No. 16/162,422, filed on Oct. 17, 2018, which claims priority to China Application Serial Number 201710985310.7, filed Oct. 20, 2017, which is herein incorporated by reference

BACKGROUND

Technical Field

The present disclosure relates to a power module and a power circuit. More particularly, the present disclosure relates to a universal power module and power circuit.

Description of Related Art

A traditional power supply usually adopts discrete components. The parasitic parameters of the elements limits the increase of the frequency of the switching power and the miniaturization of passive components, so the power density and the power supply efficiency are impacted. Also, for power supplies with different requirements, different designs and power element arrangements are needed, thus causing a long design cycle and a high cost. Since high efficiency, high power density, high reliability, and low cost have become the development directions of power supplies, an increasing number of power supplies are using modular design solutions.

However, the current modular technologies still require different designs of power modules for different applications and different power levels. Modules are not universal, and often can be used in specific applications or at similar power levels.

For the foregoing reasons, there is a need to solve the above problems by providing a power module and a power circuit.

SUMMARY

A power module is provided. The power module includes: a transformer unit including a primary winding, a magnetic core, and a secondary winding; a secondary-side circuit electrically coupled to the secondary winding of the transformer unit; a first capacitor unit including a first terminal and a second terminal; a second capacitor unit including a first terminal and a second terminal, wherein the first terminal of the second capacitor unit and the second terminal of the first capacitor unit are electrically coupled through a first node, and are electrically coupled to a first terminal of the primary winding of the transformer unit through the first node; a first switch unit including a first terminal and a second terminal; a second switch unit including a first terminal and a second terminal, the first terminal of the second switch unit and the second terminal of the first switch unit being electrically coupled through a second node, and being electrically coupled to a second terminal of the primary winding of the transformer unit through the second node; a first external pin electrically coupled to the first terminal of the first capacitor unit; a second external pin electrically coupled to the second terminal of the second capacitor unit; a third external pin electrically coupled to the first terminal of the first switch unit; a fourth external pin electrically coupled to the second terminal of the second switch unit; a fifth external pin electrically coupled to a first output terminal of the secondary-side circuit; and a sixth external pin electrically coupled to a second output terminal of the secondary-side circuit; wherein the first external pin is electrically coupled to one of the third external pin and the fourth external pin, selectively, wherein the second external pin is electrically coupled to the fourth external pin if the first external pin is electrically coupled to the third external pin, the second external pin is electrically coupled to the fourth external pin if the first external pin is electrically coupled to the fourth external pin.

The disclosure provides a power circuit. The power circuit includes a plurality of power modules. Each of the power modules includes: a transformer unit including a primary winding, a magnetic core, and a secondary winding; a secondary-side circuit electrically coupled to the secondary winding of the transformer unit; a first capacitor unit including a first terminal and a second terminal; a second capacitor unit including a first terminal and a second terminal, wherein the first terminal of the second capacitor unit and the second terminal of the first capacitor unit are electrically coupled through a first node, and are electrically coupled to a first terminal of the primary winding of the transformer unit through the first node; a first switch unit including a first terminal and a second terminal; a second switch unit including a first terminal and a second terminal, the first terminal of the second switch unit and the second terminal of the first switch unit being electrically coupled through a second node, and being electrically coupled to a second terminal of the primary winding of the transformer unit through the second node; a first external pin electrically coupled to the first terminal of the first capacitor unit; a second external pin electrically coupled to the second terminal of the second capacitor unit; a third external pin electrically coupled to the first terminal of the first switch unit; a fourth external pin electrically coupled to the second terminal of the second switch unit; a fifth external pin electrically coupled to a first output terminal of the secondary-side circuit; and a sixth external pin electrically coupled to a second output terminal of the secondary-side circuit.

The disclosure further provides a power module. The power module includes: a transformer unit including a primary winding, a magnetic core, and a secondary winding; a secondary-side circuit electrically coupled to the secondary winding of the transformer unit; a capacitor unit including a first terminal and a second terminal, the second terminal of the capacitor unit being electrically coupled to a first terminal of the primary winding of the transformer unit; a first switch unit including a first terminal and a second terminal; a second switch unit including a first terminal and a second terminal, the first terminal of the second switch unit and the second terminal of the first switch unit being electrically coupled through a node, and the node being electrically coupled to a second terminal of the primary winding of the transformer unit; a first external pin electrically coupled to the first terminal of the capacitor unit; a third external pin electrically coupled to the first terminal of the first switch unit; a fourth external pin electrically coupled to the second terminal of the second switch unit; a firth external pin electrically coupled to a first output terminal of the secondary-side circuit; and a sixth external pin electrically coupled to a second output terminal of the secondary-side circuit.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows:

FIG. 3A-1, FIG. 3A-2, and FIG. 3B depict connection methods of external pins of power modules according to some embodiments of this disclosure;

DETAILED DESCRIPTION

Figure 1:
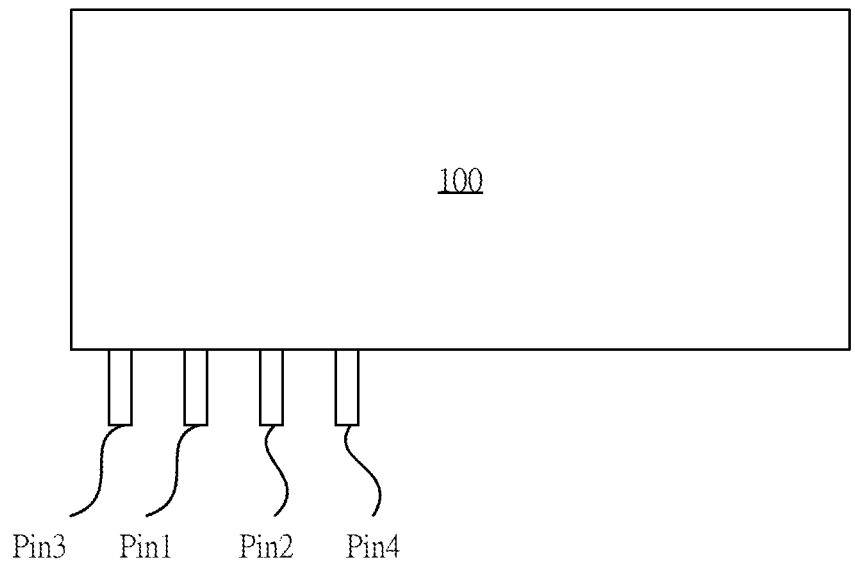
FIG. 1 depicts a schematic diagram of a power module according to one embodiment of this disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

In the following description and in the claims, the terms "include" and "comprise" are used in an open-ended fashion, and thus should be interpreted to mean "include, but not limited to." As used herein, the term "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

A description is provided with reference to FIG. 1. FIG. 1 depicts a schematic diagram of a power module 100 according to one embodiment of this disclosure. External pins Pin1, Pin2, Pin3, Pin4 of the power module 100 are directed to an outside of the power module 100. In various embodiments of the present disclosure, the power module 100 can be used in power circuits at different power levels through different connection methods of the external pins Pin1, Pin2, Pin3 and pin4 so as to be suitable for different applications, and satisfy the situations with different input and output voltages.

To simplify matters, a description is provided with reference to FIG. 2A to FIG. 2D. FIG. 2A to FIG. 2D depict schematic diagrams of an internal circuits of the power module 100 in FIG. 1.

Figure 2A:
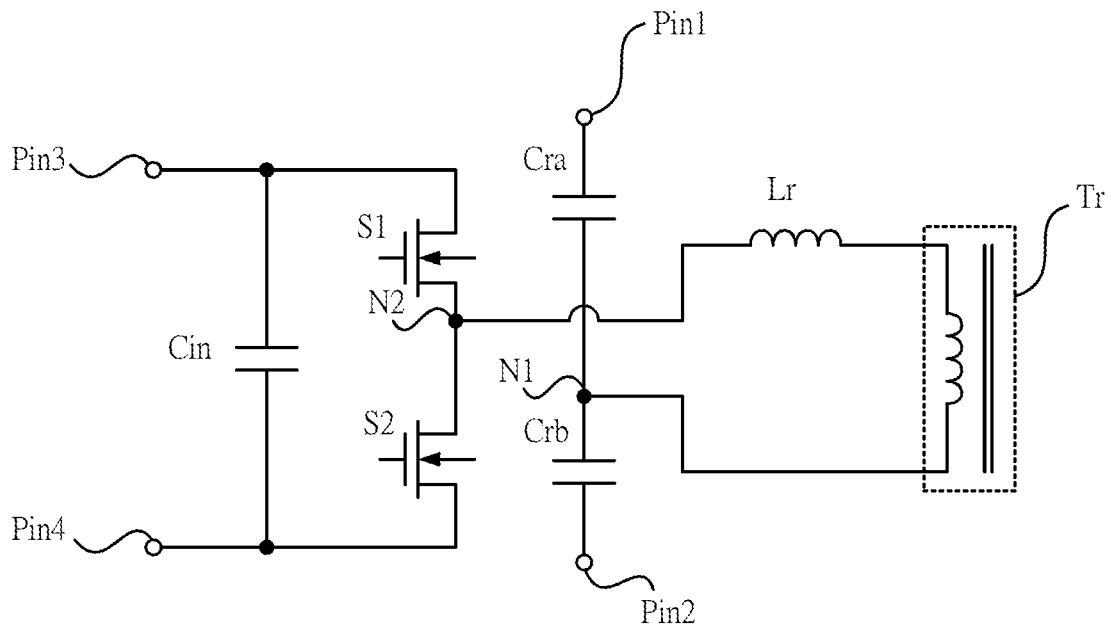
FIG. 2A to FIG. 2D depict schematic diagrams of internal circuits of the power module in FIG. 1.

A description is provided with reference to FIG. 2A. In some embodiments, the power module 100 includes a transformer unit Tr, a capacitor unit Cra, a capacitor unit Crb, a capacitor unit Cin, a switch unit S1, a switch unit S2, and an inductor unit Lr, as shown in FIG. 2A. Each of the capacitor unit Cra and the capacitor unit Crb includes a first terminal and a second terminal. The first terminal of the capacitor unit Crb and the second terminal of the capacitor unit Cra are electrically coupled through a node N1, and are electrically coupled to a first terminal of a primary winding of the transformer unit Tr through the node N1. In FIG. 2A, a magnetic core is integrated into the power module 100, which facilitates the reduction of power circuit area to provide a higher power density. In some other embodiments of the present disclosure, the magnetic core may be disposed outside the power module 100 depending on application requirements, and the present disclosure is not limited in this regard.

The external pin Pin1 of the power module 100 is electrically coupled to the first terminal of the capacitor unit Cra and directed to the outside of the power module 100. The external pin Pin2 of the power module 100 is electrically coupled to the second terminal of the capacitor unit Crb and directed to the outside of the power module 100.

At the same time, the external pin Pin3 of the power module 100 may further be electrically coupled to a first terminal of the capacitor unit Cin and directed to the outside of the power module 100. The external pin Pin4 of the power module 100 may further be electrically coupled to a second terminal of the capacitor unit Cin and directed to the outside of the power module 100. The capacitor unit Cin in the power module 100 may be a single capacitor or a combination of a plurality of capacitors connected in parallel. The capacitor unit Cin may usually be a chip capacitor or the like. In some embodiments, the power module 100 may not include the capacitor unit Cin, and the present disclosure is not limited in this regard.

Each of the switch unit S1 and the switch unit S2 includes a first terminal, a second terminal, and a control terminal. The first terminal of the switch unit S1 is electrically coupled to the external pin Pin3. The second terminal of the switch unit S2 is electrically coupled to the external pin Pin4. The first terminal of the switch unit S2 and the second terminal of the switch unit S1 are electrically coupled through a node N2, and are electrically coupled to a second terminal of the primary winding of the transformer unit Tr through the node N2.

In greater detail, the node N2 and the second terminal of the primary winding of the transformer unit Tr are electrically coupled through the inductor unit Lr. In other words, the inductor unit Lr is electrically coupled between the second terminal of the primary winding of the transformer unit Tr and the node N2. In some embodiments, the power module 100 may not include the inductor unit Lr. The transformer unit Tr may include a leakage inductance. When the power module 100 is applied to a resonant circuit, the leakage inductance has a same function as the independent inductor unit Lr shown in FIG. 2A and is a resonant inductor.

According to the embodiment shown in FIG. 2A, the capacitor units Cra and Crb are independent of each other, and each of them may be formed by connecting a plurality of capacitors in series or in parallel to obtain desired capacitances. In some embodiments, for example, in the embodiment shown in FIG. 2A, the transformer unit Tr has a relatively large magnetizing inductance.

Figure 2B:
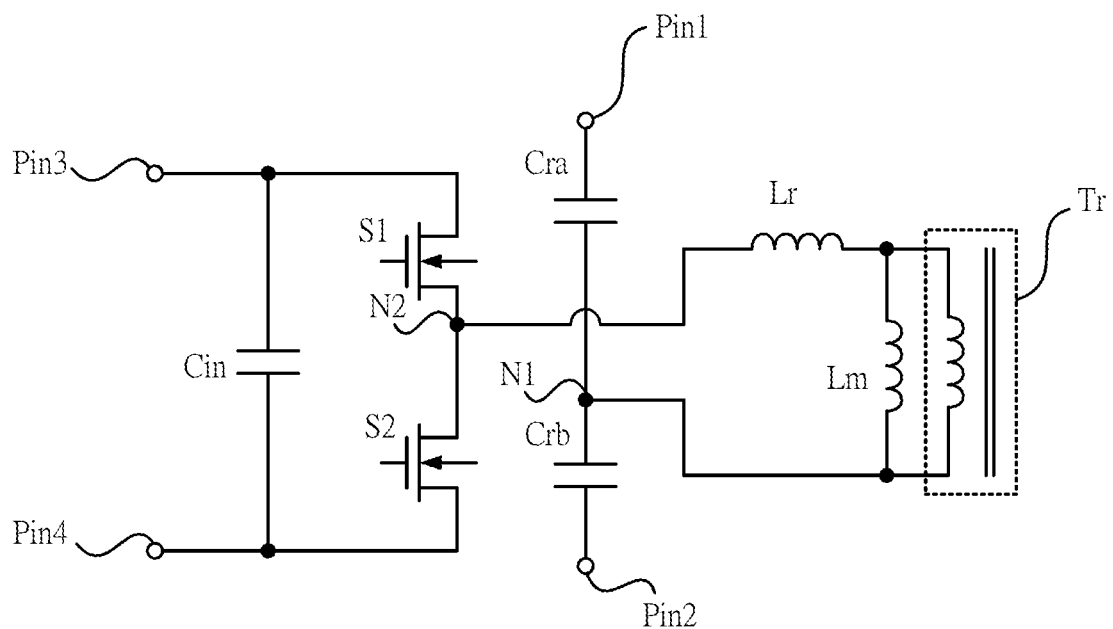

A description is provided with reference to FIG. 2B. FIG. 2B depicts a schematic diagram of an internal circuit of the power module 100 according to some other embodiments of this disclosure. In FIG. 2B, similar elements related to the embodiment shown in FIG. 2A are denoted by the same reference numerals to facilitate understanding, and a description in this regard is not provided unless they have collaborative operation relationships with the elements shown in FIG. 2B and a description is necessary because detailed principles of the similar elements have been described in the above paragraphs. In some embodiments, the power module 100 further includes an inductor unit Lm, as shown in FIG. 2B. The inductor unit Lm is electrically coupled between a first terminal and a second terminal of a primary winding of the transistor unit Tr. In some embodiments, the power module 100 may not include the inductor unit Lm, and the effect of magnetizing inductance of the transformer unit Tr can be the same as that of the independent inductance unit Lm.

Similarly, in the embodiment shown in FIG. 2B, the capacitor units Cra and Crb are independent of each other, and each of them may be formed by connecting a plurality of capacitors in series or in parallel to obtain desired capacitances.

Figure 2C:
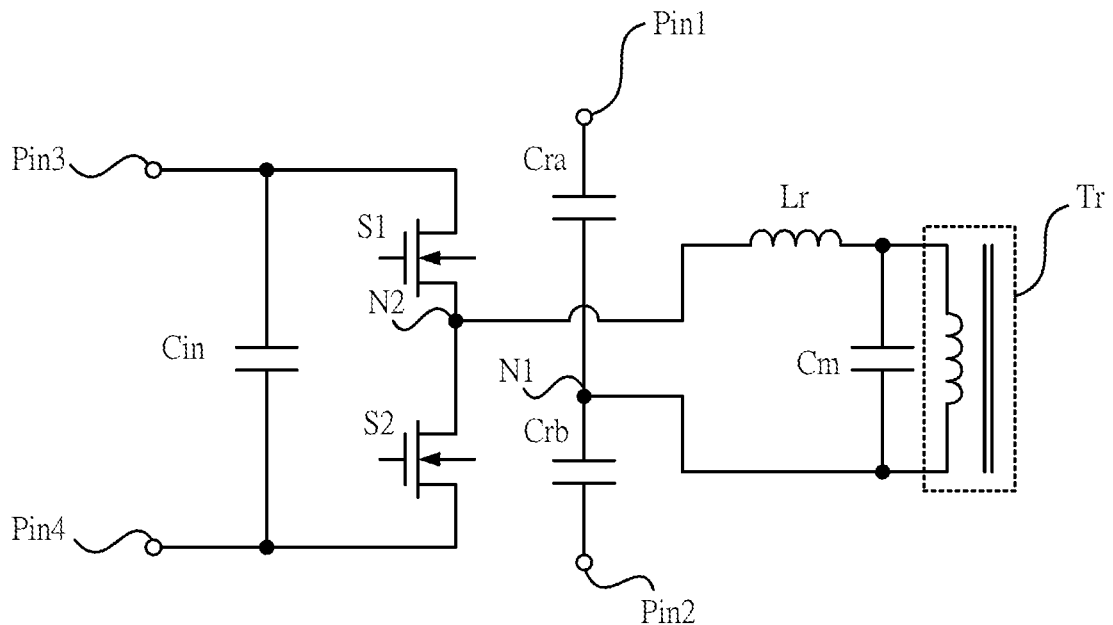

A description is provided with reference to FIG. 2C. FIG. 2C depicts a schematic diagram of an internal circuit of the power module 100 according to some other embodiments of this disclosure. In FIG. 2C, similar elements related to the embodiment shown in FIG. 2A are denoted by the same reference numerals to facilitate understanding, and a description in this regard is not provided unless they have collaborative operation relationships with the elements shown in FIG. 2C and a description is necessary because detailed principles of the similar elements have been described in the above paragraphs. As shown in FIG. 2C, the power module 100 further includes a parallel capacitor unit Cm. The parallel capacitor unit Cm is electrically coupled between a first terminal and a second terminal of a primary winding of the transformer unit Tr. In some embodiments, the power module 100 may not include the parallel capacitor unit Cm. The transformer unit Tr may include a parasitic capacitor, and the effect of the parasitic capacitance can be the same as that of the independent parallel capacitor unit Cm.

Similarly, in the embodiment shown in FIG. 2C, the capacitor units Cra and Crb are independent of each other, and each of them may be formed by connecting a plurality of capacitors in series or in parallel to obtain desired capacitances. In some embodiments, the transformer unit Tr has a relatively large magnetizing inductance in the circuit of the embodiment shown in FIG. 2C.

Figure 2D:
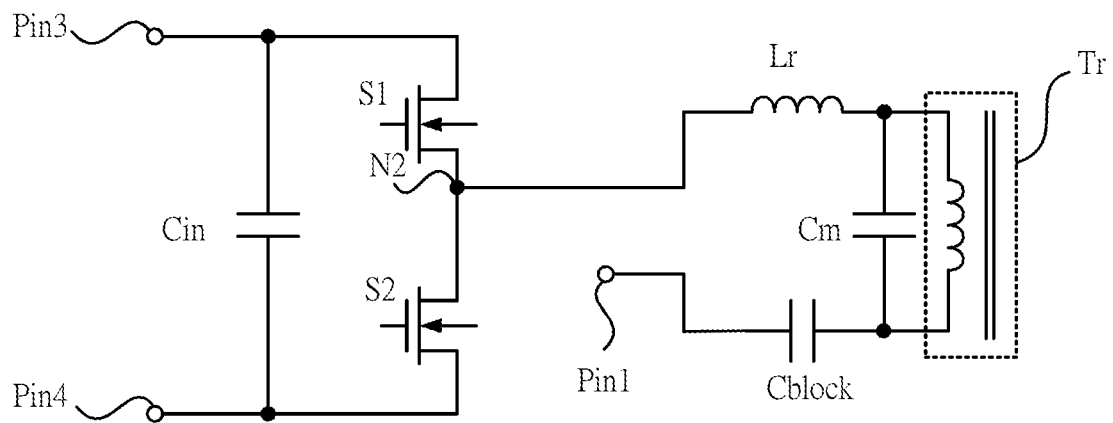

A description is provided with reference to FIG. 2D. FIG. 2D depicts a schematic diagram of an internal circuit of the power module 100 according to some other embodiments of this disclosure. In FIG. 2D, similar elements related to the embodiment shown in FIG. 2A are denoted by the same reference numerals to facilitate understanding, and a description in this regard is not provided unless they have collaborative operation relationships with the elements shown in FIG. 2D and a description is necessary because detailed principles of the similar elements have been described in the above paragraphs. In some embodiments, the power module 100 includes the transformer unit Tr, the parallel capacitor unit Cm, a capacitor unit Cblock, the switch units S1, S2, the inductor unit Lr, and the external pins Pin1, Pin3, Pin4, as shown in FIG. 2D. In the embodiment shown in FIG. 2D, the parallel capacitor unit Cm includes a first terminal and a second terminal. The parallel capacitor unit Cm is electrically coupled between a first terminal and a second terminal of a primary winding of the transformer unit Tr. The capacitor unit Cblock includes a first terminal and a second terminal. The second terminal of the capacitor unit Cblock is electrically coupled to the second terminal of the parallel capacitor unit Cm and the first terminal of the primary winding of the transformer unit Tr. Each of the switch units S1, S2 includes a first terminal, a second terminal, and a control terminal. The first terminal of the switch unit S2 and the second terminal of the switch unit S1 are electrically coupled through the node N2. The inductor unit Lr is electrically coupled between the second terminal of the primary winding of the transformer unit Tr and the node N2. The external pin Pin1 is electrically coupled to the first terminal of the capacitor unit Cblock and directed to an outside of the power module 100. The external pin Pin3 is directed to the outside of the power module 100. The external pin Pin4 is electrically coupled to the outside of the power module 100.

Similarly, in the embodiment shown in FIG. 2D, the power module 100 may not include the inductor unit Lr and/or the parallel capacitor unit Cm. The effect of leakage inductance of the transformer unit Tr and the effect of parasitic capacitor can be the same as that of the inductor unit Lr and that of the parallel capacitor unit Cm. In some embodiments, the transformer unit Tr has a relatively large magnetizing inductance in the circuit of the embodiment shown in FIG. 2D, and its impedance is much larger than an impedance of the parallel capacitor unit Cm and is negligible.

In summary, according to various embodiments of the present disclosure, the power module 100 can be implemented through different circuit topologies. A variety of different topologies, such as a half-bridge LLC resonant topology, a half-bridge LCC resonant topology, a half-bridge LC series resonant topology, or a half-bridge LC parallel resonant topology, etc., may be used to implement a primary-side structure in the power module 100. It is noted that a secondary winding of the transformer unit Tr and a secondary-side circuit are not depicted in FIG. 2A to FIG. 2D, however, the present disclosure is not limited in this regard. According to the present disclosure, the power module 100 may also include the secondary winding and the secondary-side circuit.

A description is provided with reference to FIG. 3A-1, FIG. 3A-2, and FIG. 3B. FIG. 3A-1, FIG. 3A-2, and FIG. 3B depict connection methods of external pins of the power modules 100 according to some embodiments of this disclosure. It is noted that, to simplify matters, the power module 100 shown in FIG. 2B is taken as an example in FIG. 3A-1, FIG. 3A-2, and FIG. 3B for a detailed illustration. However, the present disclosure is not limited in this regard. Those skilled in the art should understand that the external pins of the power modules 100 in FIG. 2A, FIG. 2C, and FIG. 2D may be connected according to the methods shown in FIG. 3A-1, FIG. 3A-2, and FIG. 3B.

As shown in FIG. 3A-1, FIG. 3A-2, and FIG. 3B, the power module 100 shown in FIG. 2B can constitute a half-bridge LLC circuit.

Figures 1, 3A:
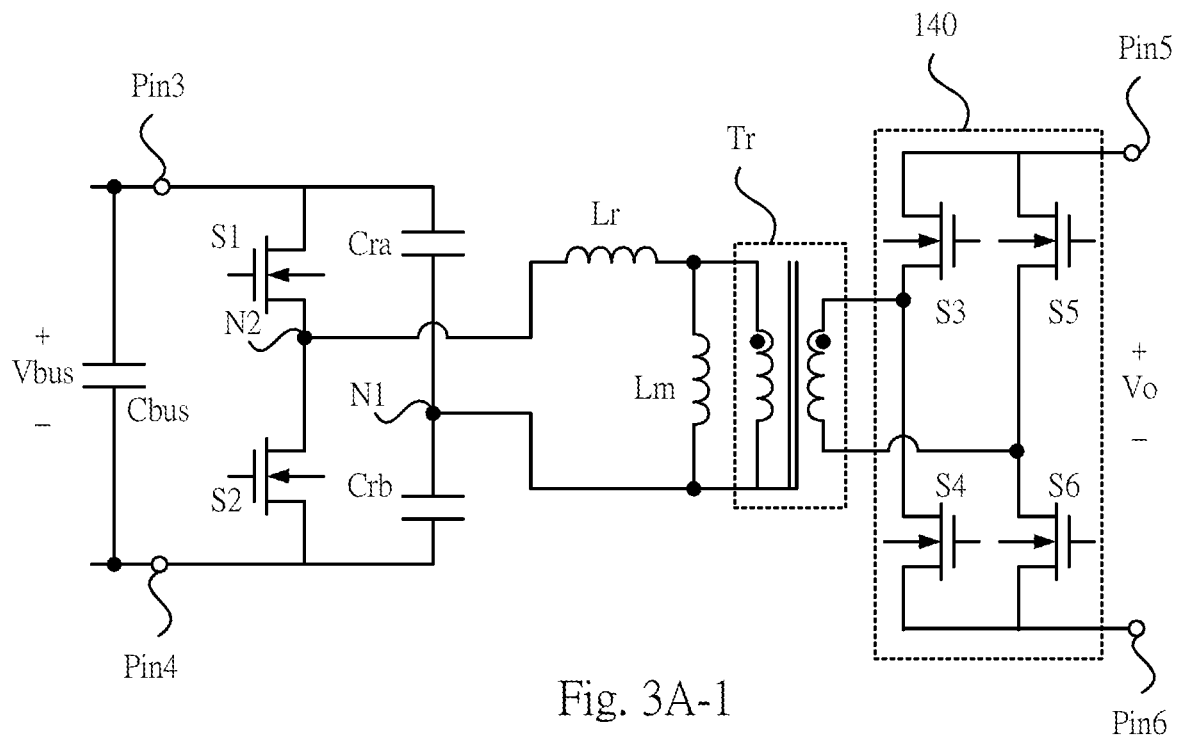
Figures 2, 3A:
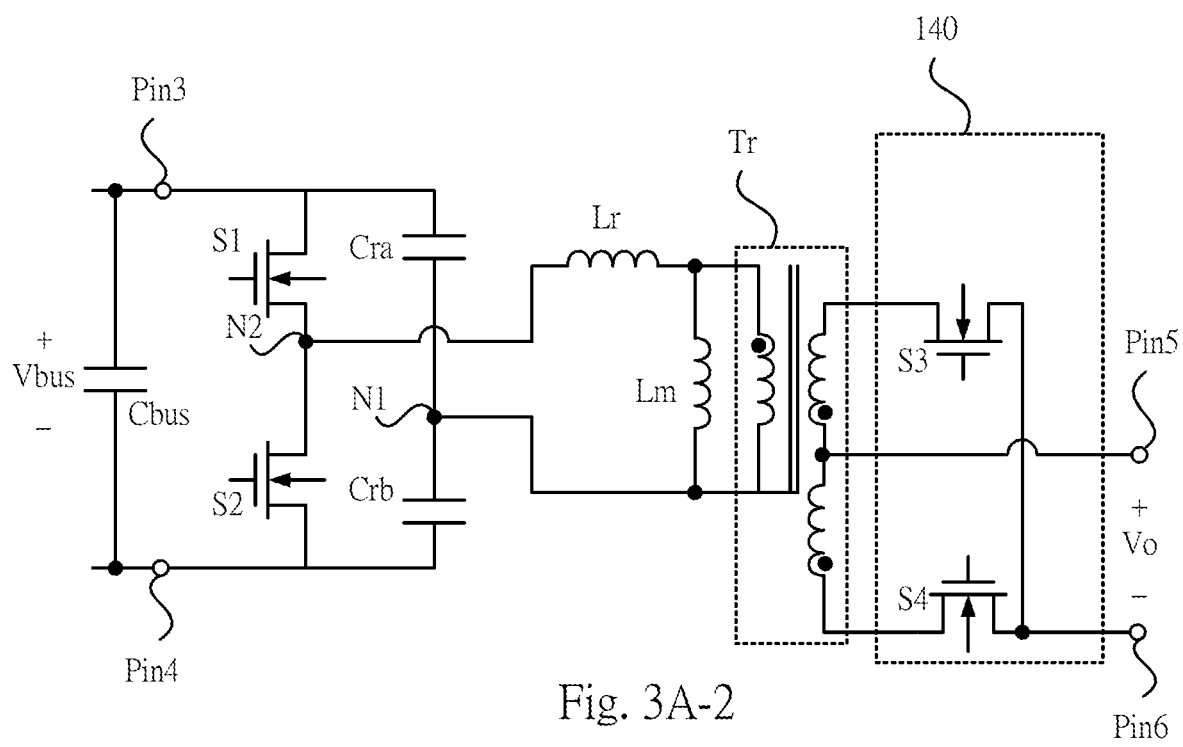
Figure 3B:
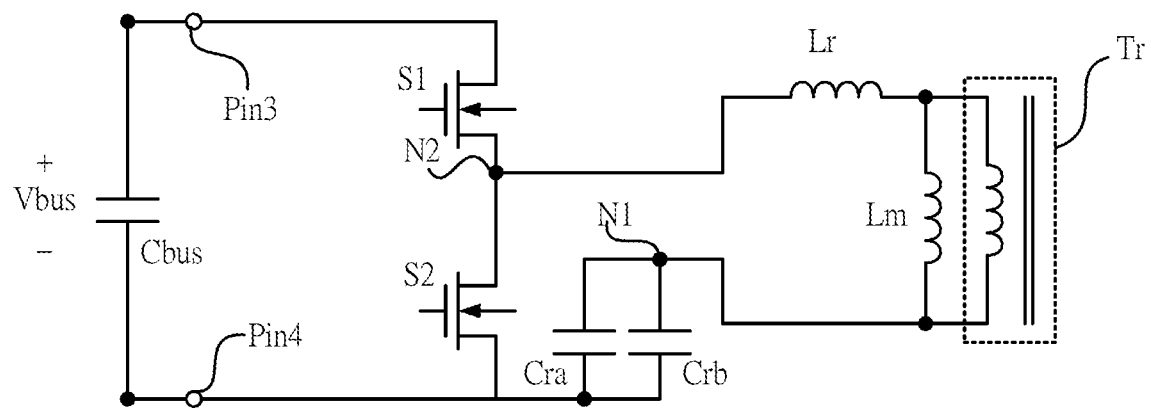

As shown in FIG. 3A-1 and FIG. 3A-2, the external pin Pin1 is electrically coupled to the external pin Pin3 outside the power module 100 and they are electrically coupled to a positive terminal of a DC bus Vbus, and the external pin Pin2 is electrically coupled to the external pin Pin4 outside the power module 100 and they are electrically coupled to a negative terminal of the DC bus Vbus. As shown in FIG. 3B, the external pin Pin1 and the external pin Pin2 are electrically coupled to the external pin Pin4 simultaneously outside the power module 100 and they are electrically coupled to the negative terminal of the DC bus Vbus, and the external pin Pin3 is electrically coupled to the positive terminal of the DC bus Vbus outside the power module 100 according to some embodiments. It is noted that, in order to simplify the drawings, reference numerals of the external pins Pin1, Pin2 are omitted in FIG. 3A-1, FIG. 3A-2, and FIG. 3B, that is, part of the reference numerals of the external pins that are electrically coupled are omitted. Since the same situation occurs in the following description, a description in this regard is not provided. If necessary, a bus capacitor unit Cbus may be further connected between the external pins Pin3 and Pin4, that is, between the positive terminal and the negative terminal of Vbus, for input voltage regulation. The bus capacitor unit Cbus may be a single capacitor, or a combination of a plurality of capacitors connected in series or in parallel.

In summary, as shown in FIG. 3A-1, FIG. 3A-2, and FIG. 3B, the external pin Pin1 is electrically coupled to one of the external pin Pin3 and the external pin Pin4 selectively outside the power module 100. If the external pin Pin1 is electrically coupled to the external pin Pin3, then the external pin Pin2 is electrically coupled to the external pin Pin4. If the external pin Pin1 is electrically coupled to the external pin Pin4, then the external pin Pin2 is electrically coupled to the external pin Pin4.

Therefore, in some embodiments, the external pin Pin1 is electrically coupled to the external pin Pin3 and the external pin Pin2 is electrically coupled to the external pin Pin4, such that the power module 100 forms a resonant circuit. In some other embodiments, the external pin Pin1 is electrically coupled to the external pin Pin4 and the external pin Pin2 is electrically coupled to the external pin Pin4, such that the power module 100 forms a resonant circuit.

In addition, as shown in FIG. 3A-1 and FIG. 3A-2, the power module 100 further includes a secondary winding of the transformer unit Tr, a secondary-side circuit 140, an external pin Pin5, and an external pin Pin6 according to some embodiments. The secondary-side circuit 140 is electrically coupled to the secondary winding of the transformer unit Tr. The external pin Pin5 is electrically coupled to a first output terminal of the secondary-side circuit and directed to an outside of the power module 100. The external pin Pin6 is electrically coupled to a second output terminal of the secondary-side circuit 140 and directed to the outside of the power module 100.

In greater detail, as shown in FIG. 3A-1, the secondary winding of the transformer unit Tr includes a first terminal and a second terminal, and the secondary-side circuit 140 includes a third switch unit S3, a fourth switch unit S4, a fifth switch unit S5, and a sixth switch unit S6 according to some embodiments. A first terminal of the third switch unit S3 and a first terminal of the fifth switch unit S5 are electrically coupled through the first output terminal. A second terminal of the fourth switch unit S4 and a second terminal of the sixth switch unit S6 are electrically coupled through the second output terminal. A second terminal of the third switch unit S3 and a first terminal of the fourth switch unit S4 are electrically coupled through the first terminal. A second terminal of the fifth switch unit S5 and a first terminal of the sixth switch unit S6 are electrically coupled through the second terminal.

In some embodiments, as shown in FIG. 3A-2, the secondary winding of the transformer unit Tr further includes a center tap, that is, includes a first terminal, a second terminal, and a third terminal. The secondary-side circuit 140 includes a third switch unit S3 and a fourth switch unit S4. A first terminal of the third switch unit S3 is electrically coupled to the first terminal of the secondary winding. A first terminal of the fourth switch unit S4 is electrically coupled to the second terminal of the secondary winding. A second terminal of the third switch unit S3 and a second terminal of the fourth switch unit S4 are electrically coupled thorough the second output terminal. The third terminal of the secondary winding is electrically coupled to the first output terminal. It is noted that some other transformer secondary windings and secondary-side circuits according to the prior art may be used depending on different applications, and the present disclosure is not limited in this regard.

Additionally, those skilled in the art should understand that the power module 100 in each of FIG. 2A, FIG. 2C, and FIG. 2D may also include the secondary winding, the secondary-side circuit, and the fifth external pin and the sixth external pin correspondingly connected to the output terminals of the secondary-side circuit. A description in this regard is not provided.

Figure 4:
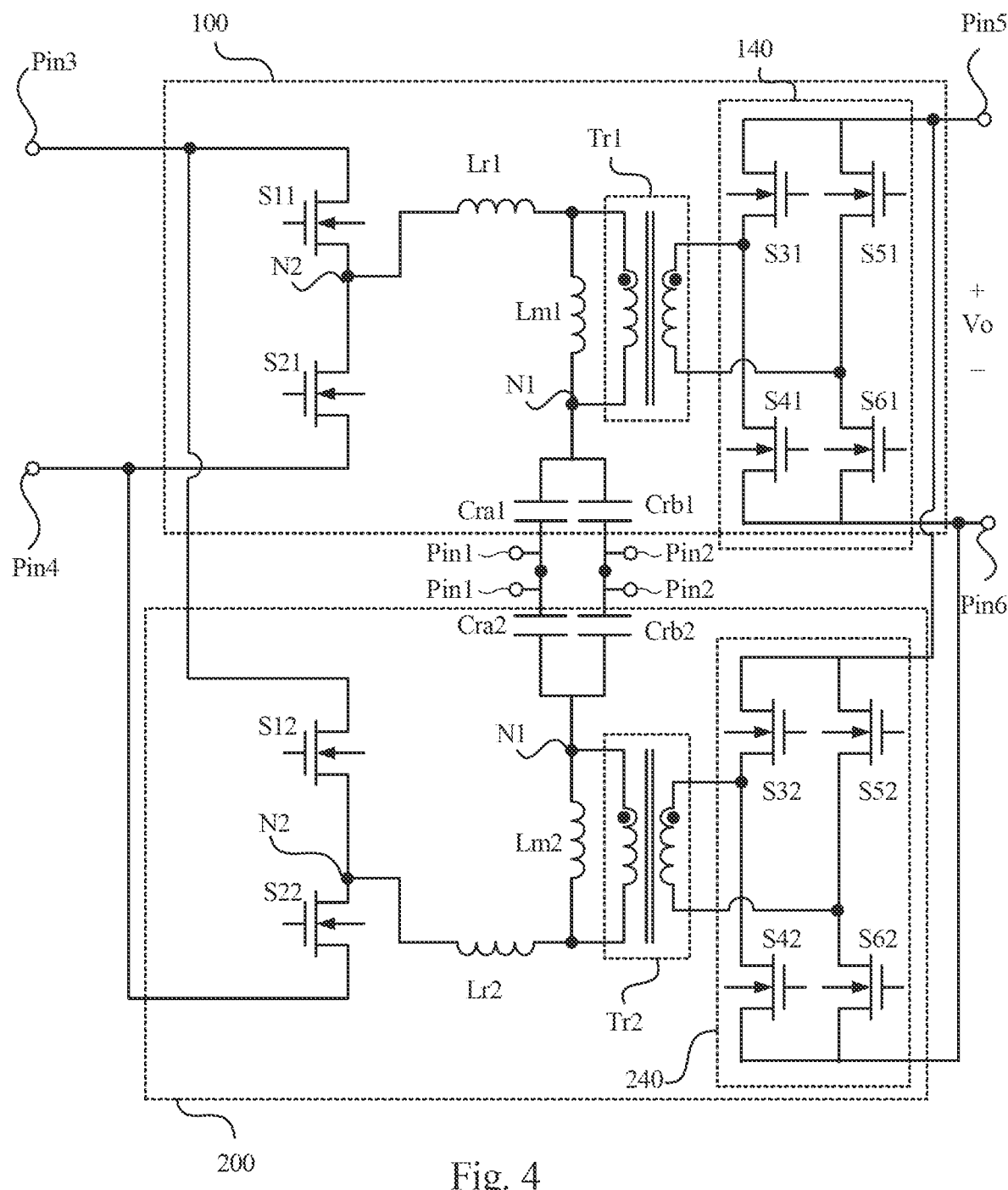
FIG. 4 depicts a power circuit according to some embodiments of this disclosure.

A description is provided with reference to FIG. 4. FIG. 4 depicts a power circuit according to some embodiments of this disclosure. It is noted that, to simplify matters, in FIG. 4 a plurality of power modules shown in FIG. 2B being connected is taken as an example for a detailed illustration, but the present disclosure is not limited in this regard. Those skilled in the art should understand that the external pins of the power modules in FIG. 2A, FIG. 2C, and FIG. 2D may be connected according to the method shown in FIG. 4. In other words, in various embodiments, the power module 100 and a power module 200 in the power circuit depicted in FIG. 4 may be implemented by using any of the power modules shown in FIG. 2A-FIG. 2D. Since their internal structures are described in detail in the previous paragraphs, a description in this regard is not provided.

As shown in the power circuit of FIG. 4, in some embodiments, the power circuit may include the plurality of power modules 100, 200. When an overall power level of the system is doubled, the power level can be raised by connecting the two power modules 100, 200. As shown in FIG. 2B and FIG. 4, the power modules 100, 200 include transformer units Tr1, Tr2, capacitor units Cra1, Cra2, capacitor units Crb1, Crb2, and external pins Pin1-Pin4, respectively. First terminals of the capacitor units Crb1, Crb2 are electrically coupled to second terminals of the capacitor units Cra1, Cra2 through nodes N1, and are electrically coupled to first terminals of primary windings of the transformer units Tr1, Tr2, respectively. The external pins Pin1 are electrically coupled to first terminals of the capacitor units Cra1, Cra2 and directed to outsides of the power modules. The external pins Pin2 are electrically coupled to second terminals of the capacitor units Crb1, Crb2 and directed to the outsides of the power modules. The external pins Pin3 and the external pins Pin4 are directed to the outsides of the power modules. In addition, the power modules 100, 200 further include switch units S11, S21 and switch units S12, S22, respectively. First terminals of the switch units S11, S12 are electrically coupled to the external pins Pin3 of the power modules 100, 200, respectively. Second terminals of the switch units S21, S22 are electrically coupled to the external pins Pin4 of the power modules 100, 200, respectively. First terminals of the switch units S21, S22 are electrically coupled to second terminals of the switch unit S11, S12 through nodes N2, and are electrically coupled to second terminals of primary windings of the transformer units Tr1, Tr2 through the nodes N2, respectively.

In addition to that, in some embodiments, the power modules 100, 200 further include secondary windings of the transformer units Tr1, Tr2, the secondary-side circuits 140, 240, the external pins Pin5, and the external pins Pin6, respectively. The secondary-side circuits 140, 240 are electrically coupled to the secondary windings of the transformer units Tr1, Tr2, respectively. First output terminals of the secondary-side circuits 140, 240 are electrically coupled to the external pins Pin5, respectively, and the external pins Pin5 are directed to the outsides of the power modules. Second output terminals of the secondary-side circuits 140, 240 are electrically coupled to the external pins Pin6, respectively, and the external pins Pin6 are directed to the outsides of the power modules. In greater detail, the secondary windings of the transformer units Tr1, Tr2 and the secondary-side circuits 140, 240 may adopt the secondary winding of the transformer unit and the secondary-side circuit shown in FIG. 3A-1. That is, each of the secondary windings of the transformer units Tr1, Tr2 includes two terminals, and the secondary-side circuits 140, 240 respectively include four switch units S31-S61 and four switch units S32-S62. It is noted that although in FIG. 4 the secondary windings and the secondary-side circuits 140, 240 being full-bridge structures is taken as an example, the present disclosure is not limited in this regard. Different secondary-side circuits and secondary windings may be used depending on different applications. For example, the secondary winding and the secondary-side circuit shown in FIG. 3A-2 may be used on a secondary side of each of the power modules 100, 200 shown in FIG. 4, and a description is this regard is not provided.

In greater detail, the power modules 100, 200 can achieve full-bridge LLC resonant circuits through connecting the external pins correspondingly. As shown in FIG. 1 and FIG. 4, the power modules 100, 200 may be fixed to a main board, and the external pins Pin1-Pin4 of the power modules 100, 200 are connected correspondingly to obtain the full-bridge LLC resonant circuits.

In other words, the external pin Pin1 of the power module 100 in the power modules 100, 200 is configured to be electrically coupled to the external pin Pin1 of the power module 200 in the power modules 100, 200, the external pin Pin2 of the power module 100 is configured to be electrically coupled to the external pin Pin2 of the power module 200, the external pin Pin3 of the power module 100 is configured to be electrically coupled to the external pin Pin3 of the power module 200, and the external pin Pin4 of the power module 100 is configured to be electrically coupled to the external pin Pin4 of the power module 200 outside the power modules. Connection points of capacitors of the power modules 100, 200 in FIG. 4 have a stable voltage potential, which is half a bus voltage. The connection points are not high-frequency bouncing points. The interference is less and the connection is easy.

Additionally, in some embodiments, the external pin Pin5 of the power module 100 is configured to be electrically coupled to the external pin Pin5 of the power module 200, and the external pin Pin6 of the power module 100 is configured to be electrically coupled to the external pin Pin6 of the power module 200 outside the power modules as shown in FIG. 4. For the transformer units Tr1, Tr2, the primary windings are connected in series and the secondary windings are connected in parallel, thus ensuring the natural balance between currents on the secondary sides.

Figure 5:
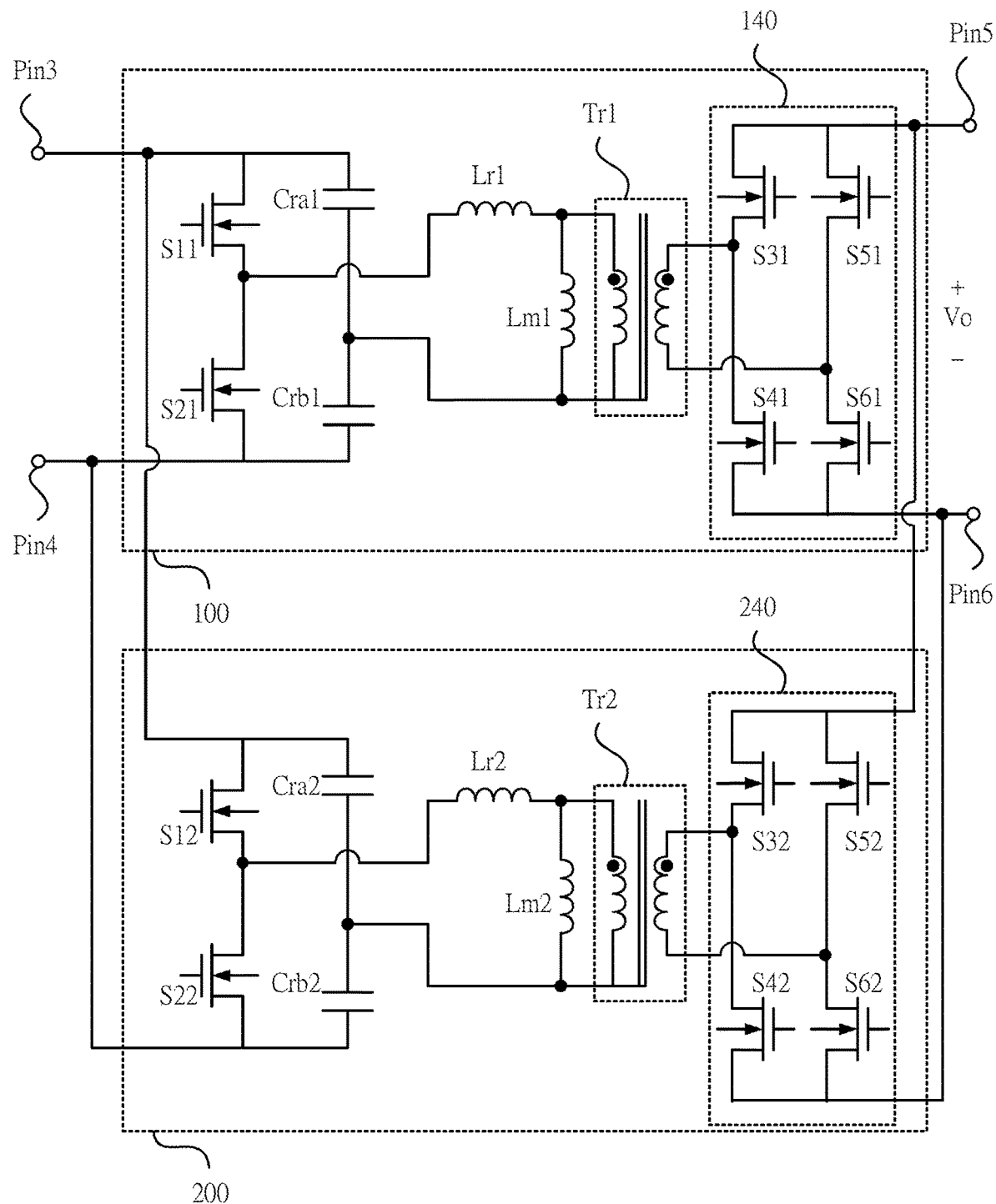
FIG. 5 depicts a power circuit according to some embodiments of this disclosure.

A description is provided with reference to FIG. 5. FIG. 5 depicts a power circuit according to some embodiments of this disclosure. It is noted that, to simplify matters, in FIG. 5 the power module shown in FIG. 2B is taken as an example for illustration. However, the present disclosure is not limited in this regard. Those skilled in the art should understand that the external pins of the power modules in FIG. 2A, FIG. 2C and FIG. 2D may be connected according to the method shown in FIG. 5. In various embodiments, the power modules 100, 200 in the power circuit depicted in FIG. 5 may be implemented by using any of the power modules shown in FIG. 2A-FIG. 2D. Since their internal structures are described in detail in the previous paragraphs, a description in this regard is not provided.

As compared with the power circuit shown in FIG. 4, the external pin Pin3 of the power module 100 is configured to be electrically coupled to the external pin Pin3 of the power module 200, and the external pin Pin4 of the power module 100 is configured to be electrically coupled to the external pin Pin4 of the power module 200 outside the power modules in the power circuit shown in FIG. 5. The external pin Pin1 of the power module 100 is configured to be electrically coupled to the external pin Pin3 of the power module 100. The external pin Pin2 of the power module 100 is configured to be electrically coupled to the external pin Pin4 of the power module 100. The external pin Pin1 of the power module 200 is configured to be electrically coupled to the external pin pin3 of the power module 200. The external pin Pin2 of the power module 200 is configured to be electrically coupled to the external pin Pin4 of the power module 200.

In addition, in some embodiments, the power modules 100, 200 further include secondary windings of the transformer units Tr1, Tr2, the secondary-side circuits 140, 240, the external pins Pin5, and the external pins Pin6, respectively, as shown in FIG. 5. The external pin Pin5 of the power module 100 is configured to be electrically coupled to the external pin Pin5 of the power module 200, and the external pin Pin6 of the power module 100 is configured to be electrically coupled to the external pin Pin6 of the power module 200 outside the power modules. As a result, in the power circuit of FIG. 5, a plurality of power modules 100, 200 can be used to form an input-parallel output-parallel interleaved half-bridge LLC resonant circuit to effectively reduce the output current ripples. Since internal structures of the power modules 100, 200 are described in detail in the previous paragraphs, a description in this regard is not provided.

Figure 6:
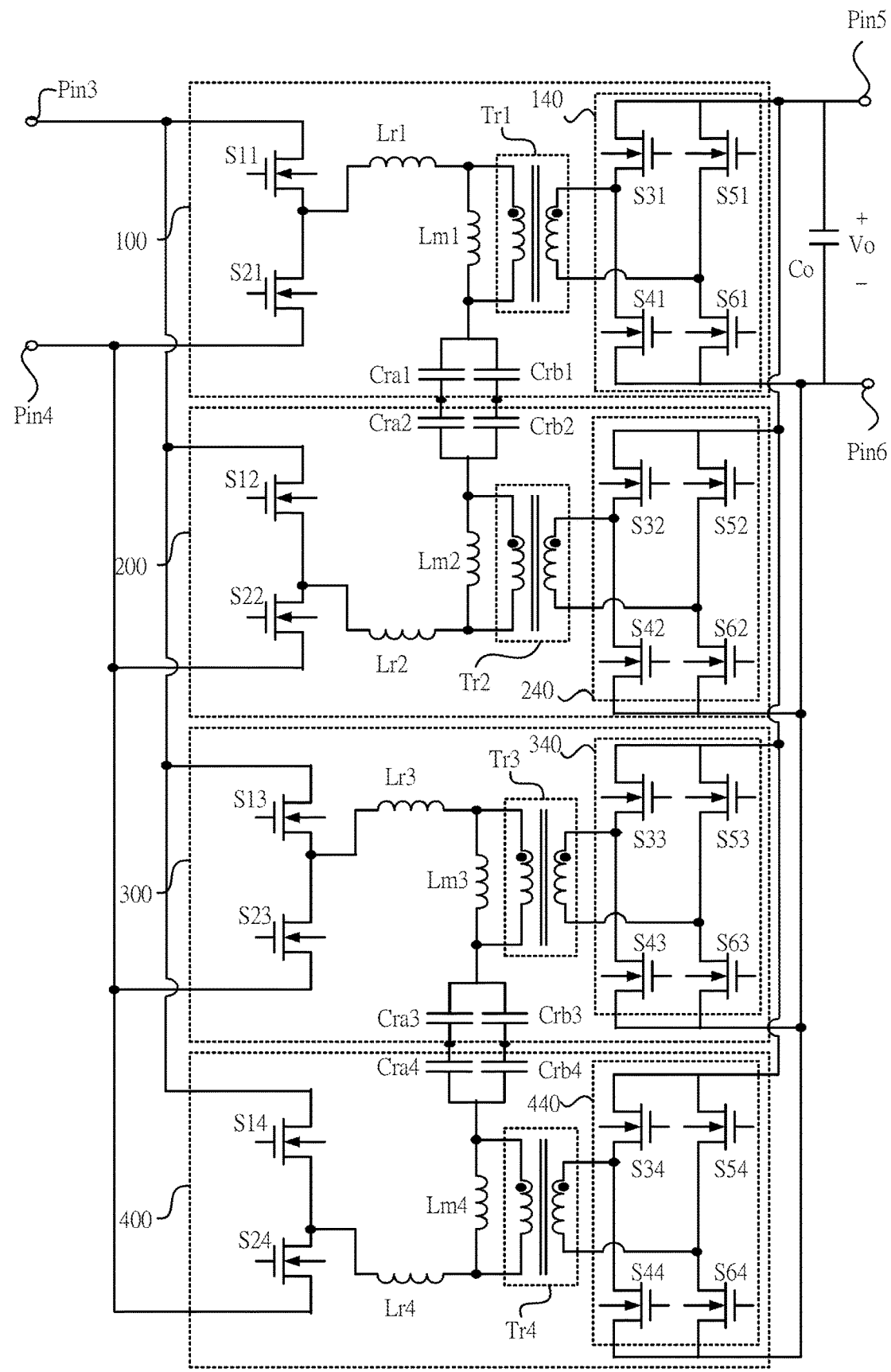
FIG. 6 depicts a power circuit according to some embodiments of this disclosure.

A description is provided with reference to FIG. 6. FIG. 6 depicts a power circuit according to some embodiments of this disclosure. In the power circuit of FIG. 6, the power modules may be implemented by using any of the power modules shown in FIG. 2A-FIG. 2D. It is noted that, to simplify matters, in FIG. 6 the power module shown in FIG. 2B is taken as an example for a detailed illustration. However, the present disclosure is not limited in this regard. Those skilled in the art should understand that the external pins of the power modules 100 in FIG. 2A, FIG. 2C, and FIG. 2D may be connected according to the method shown in FIG. 6. In greater detail, the power circuit in FIG. 6 uses a plurality of power modules to form an interleaved full-bridge LLC resonant circuit. Inputs of the power modules are connected in parallel and outputs of the power modules are connected in parallel. The power circuit in FIG. 6 may be regarded as a power circuit formed by connecting two power circuits shown in FIG. 4 in parallel.

In greater detail, the power circuit in FIG. 6 includes the power modules 100, 200 and power modules 300, 400. As shown in FIG. 6, the external pins Pin3 of the power modules 100, 200 and external pins Pin3 of the power modules 300, 400 are electrically coupled to one another, and the external pins Pin4 of the power modules 100, 200 and external pins Pin4 of the power modules 300, 400 are electrically coupled to one another according to some embodiments. At the same time, the external pins Pin1 of the power modules 100, 200 are correspondingly connected and the external pins Pin2 of the power modules 100, 200 are correspondingly connected to obtain full-bridge LLC resonant circuits. External pins Pin1 of the power modules 300, 400 are correspondingly connected and external pins Pin2 of the power modules 300, 400 are correspondingly connected to obtain full-bridge LLC resonant circuits. In other words, the external pin Pin1 of the power module 100 is configured to be electrically coupled to the external pin Pin1 of the power module 200, the external pin Pin2 of the power module 100 is configured to be electrically coupled to the external pin Pin2 of the power module 200, the external pin Pin1 of the power module 300 is configured to be electrically coupled to the external pin Pin1 of the power module 400, and the external pin Pin2 of the power module 300 is configured to be electrically coupled to the external pin Pin2 of the power module 400 outside the power modules. As a result, connection points of capacitors of the power modules 100, 200 and connection points of capacitors of the power modules 300, 400 in FIG. 6 all have a stable voltage potential, which is half a bus voltage. The connection points are not high-frequency bouncing points. The interference is less and the connection is easy.

In addition, in some embodiments, the power modules 100, 200, 300, 400 further include secondary windings of transformer units Tr1, Tr2, Tr3, Tr4, secondary-side circuits 140, 240, 340, 440, external pins Pin5, and external pins Pin6, respectively, as shown in FIG. 6. The external pins Pin5 of the power modules 100, 200, 300, 400 are electrically coupled to one another, and the external pins Pin6 of the power modules 100, 200, 300, 400 are electrically coupled to one another outside the power modules. For the transformer units Tr1, Tr2, the primary windings are connected in series and the secondary windings are connected in parallel. Similarly, for the transformer units Tr3, Tr4, the primary windings are also connected in series and the secondary windings are also connected in parallel. As a result, the natural balance between currents on the secondary sides of the power modules 100, 200 and the power modules 300, 400 can be ensured. Since internal structures of the power modules 100, 200, 300, 400 are described in detail in the previous paragraphs, a description in this regard is not provided.

Figure 7:
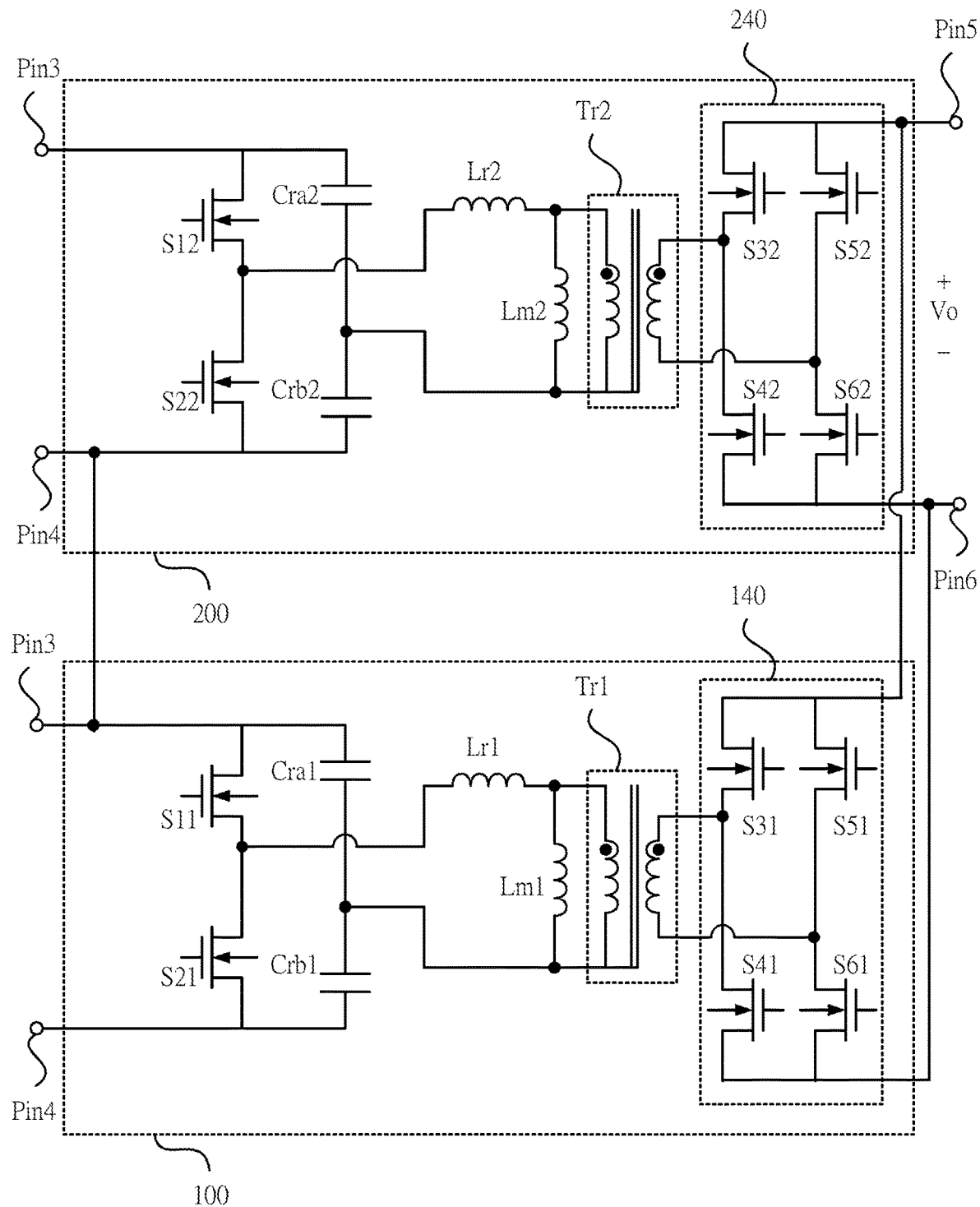
FIG. 7 depicts a power circuit according to some embodiments of this disclosure.

A description is provided with reference to FIG. 7. FIG. 7 depicts a power circuit according to some embodiments of this disclosure. It is noted that, to simplify matters, in FIG. 7 the power module shown in FIG. 2B is taken as an example for a detailed illustration. However, the present disclosure is not limited in this regard. Those skilled in the art should understand that the external pins of the power modules in FIG. 2A, FIG. 2C and FIG. 2D may be connected according to the method shown in FIG. 7.

As compared with the power circuits shown in FIG. 4 and FIG. 5, the power circuit in FIG. 7 can use an input-series and output-parallel structure constituted by two or more power modules 100, 200. In various embodiments, the power modules 100, 200 may be implemented by using any of the power modules shown in FIG. 2A-FIG. 2D. Since their internal structures are described in detail in the previous paragraphs, a description in this regard is not provided.

In the power circuit of FIG. 7, the external pin Pin3 of the power module 100 is configured to be electrically coupled to the external pin Pin4 of the power module 200, the external pin Pin1 of the power module 100 is configured to be electrically coupled to the external pin Pin3 of the power module 100, the external pin Pin2 of the power module 100 is configured to be electrically coupled to the external pin Pin4 of the power module 100, the external pin Pin1 of the power module 200 is configured to be electrically coupled to the external pin Pin3 of the power module 200, and the external pin pin2 of the power module 200 is configured to be electrically coupled to the external pin Pin4 of the power module 200 outside the power modules.

In addition, in some embodiments, the power modules 100, 200 further include secondary windings of the transformer units Tr1, Tr2, the secondary-side circuits 140, 240, the external pins Pin5, and the external pins Pin6, respectively. The external pin Pin5 of the power module 100 is configured to be electrically coupled to the external pin Pin5 of the power module 200, and the external pin Pin6 of the power module 100 is configured to be electrically coupled to the external pin Pin6 of the power module 200 outside the power modules, as shown in FIG. 7.

Figure 8:
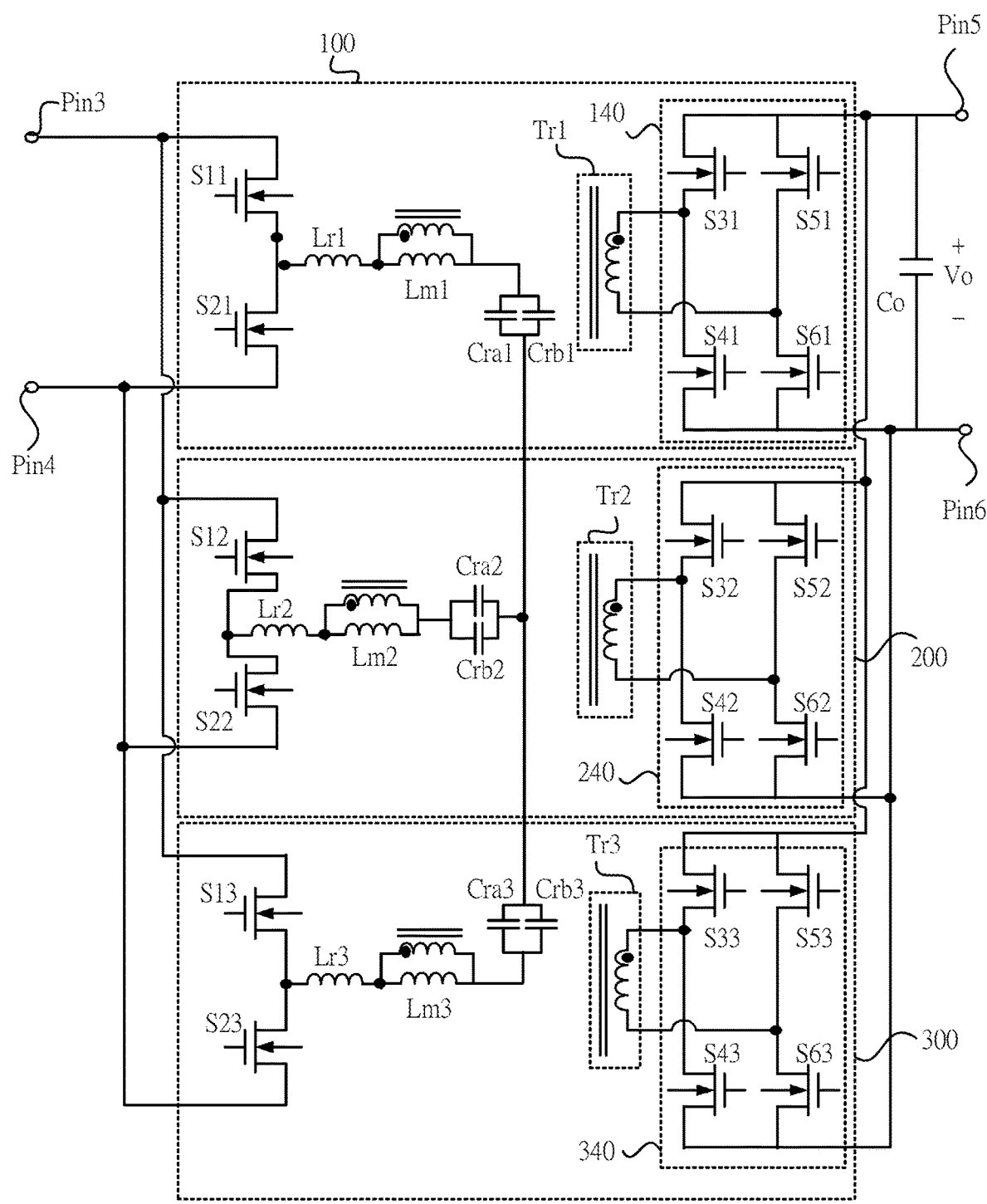
FIG. 8 depicts a power circuit according to some embodiments of this disclosure.

A description is provided with reference to FIG. 8. FIG. 8 depicts a power circuit according to some embodiments of this disclosure. It is noted that, to simplify matters, in FIG. 8 the power module shown in FIG. 2B is taken as an example for a detailed illustration. However, the present disclosure is not limited in this regard. Those skilled in the art should understand that the external pins of the power modules in FIG. 2A, FIG. 2C and FIG. 2D may be connected according to the method shown in FIG. 8.

The power circuit in FIG. 8 can use the three power modules 100, 200, 300 to constitute a three-phase LLC resonant circuit. In various embodiments, the power modules 100, 200, 300 may be implemented by using any of the power modules shown in FIG. 2A-FIG. 2D. Since their internal structures are described in detail in the previous paragraphs, a description in this regard is not provided. In the power circuit of FIG. 8, the external pin Pin1 and the external pin Pin2 of the power module 100, the external pin Pin1 and the external pin Pin2 of the power module 200, and the external pin Pin1 and the external pin Pin2 of the power module 300 are electrically coupled to one another, the external pins Pin3 and the external pins Pin4 of the power modules 100, 200, 300 are electrically coupled to one another. As a result, the power modules 100, 200, 300 form a three-phase resonant circuit.

Additionally, in some embodiments, the power modules 100, 200, 300 further include secondary windings of the transformer units Tr1, Tr2, Tr3, the secondary-side circuits 140, 240, 340, the external pins Pin5, and the external pins Pin6, respectively. The external pins Pin5 of the power modules 100, 200, 300 are electrically coupled to one another, and the external pins Pin6 of the power modules 100, 200, 300 are electrically coupled to one another outside the power modules, as shown in FIG. 8.

Figure 9:
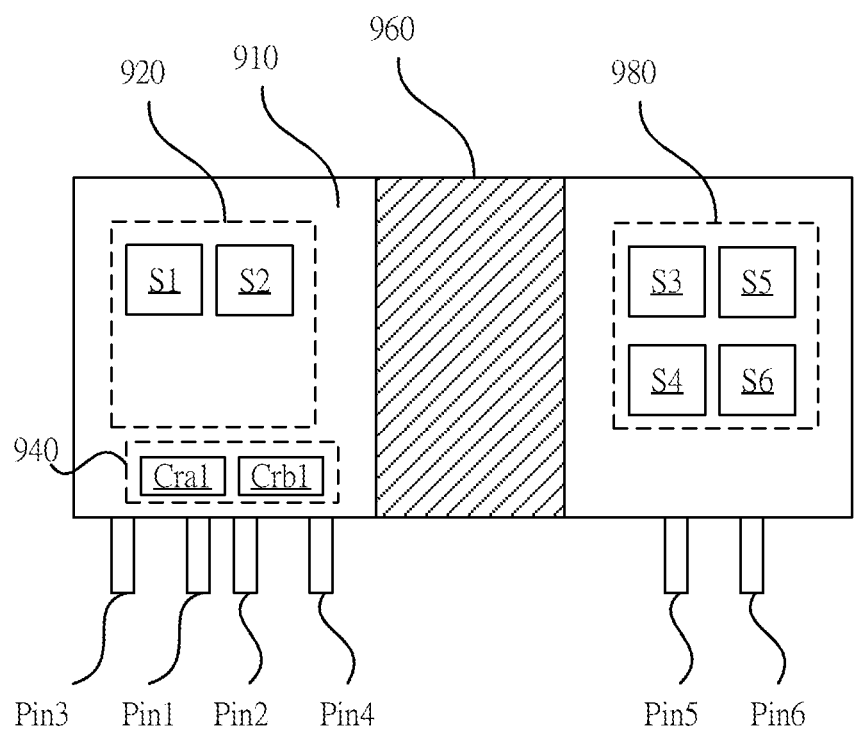
FIG. 9 depicts an external schematic diagram of a power module according to some embodiments of this disclosure.

A description is provided with reference to FIG. 9. FIG. 9 depicts an external schematic diagram of a power module according to some embodiments of this disclosure. A power module 900 includes a main board 910, a primary switch unit 920, a capacitor unit 940, a transformer 960, and a secondary switch unit 980. In some embodiments, the primary switch unit 920 includes switch units S1, S2. The secondary switch unit 980 includes switch units S3, S4, S5, S6. The capacitor unit 940 includes capacitor units Cra1, Crb1. Elements in the power module 900, such as the switches, transformers, capacitors, inductors, etc. may be electrically coupled to one another to implement the primary-side circuits and secondary-side circuits in the power modules of the above embodiments, for example, the internal circuits shown in FIG. 2A to FIG. 2D. Since the electrical coupling relationships between the various elements are provided in detail in the previous embodiments, a description is this regard is not provided.

As for the structure, the primary switch unit 920, the capacitor unit 940, the transformer 960, the secondary switch unit 980, etc. may be disposed on the main board 910. For example, the capacitor unit 940 may be a chip element. The transformer 960 may be a planar transformer. The primary switch unit 920, the secondary switch unit 980, and the inductor unit integrated with the transformer 960 may be implemented by using planar elements correspondingly. It is noted that the present disclosure is not limited to the positions on the main board 910 at which the above elements are located. External pins Pin1-Pin6 in FIG. 9 extend outside the main board 910. The external pins Pin1-Pin4 may be a first pin to a fourth pin on a primary side, and the external pins Pin5-Pin6 may be a fifth pin to a sixth pin on a secondary side. In some other embodiments, the power module 900 may further include some other external pins, such as a control pin and the like. However, the present disclosure is not limited in this regard. In this manner, the power module 900 can achieve the power circuits of the above embodiments. Through different connection methods of the external pins, the power module 900 is applied to power circuits at different power levels to be suitable for different applications and satisfy the situations with different input and output voltages. In some applications, a plurality of power modules 900 may be vertically inserted into a same printed circuit board to complete the connection of external pins through the current path disposed on the printed circuit board. In addition to that, each of the external pins may further be divided into a plurality of pins having a same voltage potential depending on application needs.

Since the connections between the external pins are implemented outside of the power modules, the power modules have a good portability. Therefore, the situations with different input and output voltages are satisfied by utilizing different connection methods of external pins as long as a single module is designed. The design time is saved to reduce cost.

In addition, random combinations of input-series, input-parallel, output-series, and output-parallel may be realized by utilizing the power modules according to the present disclosure to cooperate with control methods correspondingly. It is noted that drawings, embodiments, and features and circuits in the embodiments according to the present disclosure may be combined with each other without conflict. The circuits depicted in the drawings are only for illustration purposes, and are simplified to make the description simple and facilitate understanding, and are not intended to limit the present disclosure. Additionally, the circuit elements described in the above embodiments may be implemented by using a variety of different methods. For example, each of the switch units may be implemented by using a bipolar junction transistor (BJT), a metal-oxide-semiconductor field-effect transistor (MOSFET), or some other suitable semiconductor element. In addition to that, the present disclosure is not limited to the power flow of the power circuits constituted by the power modules as described previously.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A power circuit comprising:
a plurality of power modules, each of the power modules comprising:
a transformer unit comprising a primary winding, a magnetic core, and a secondary winding;
a first capacitor unit comprising a first terminal and a second terminal;
a second capacitor unit comprising a first terminal and a second terminal, wherein the first terminal of the second capacitor unit and the second terminal of the first capacitor unit are electrically coupled through a first node, and are electrically coupled to a first terminal of the primary winding of the transformer unit through the first node;
a first switch unit comprising a first terminal and a second terminal;
a second switch unit comprising a first terminal and a second terminal, wherein the first terminal of the second switch unit and the second terminal of the first switch unit are electrically coupled through a second node, and electrically coupled to a second terminal of the primary winding of the transformer unit through the second node;
a first external pin electrically coupled to the first terminal of the first capacitor unit;
a second external pin electrically coupled to the second terminal of the second capacitor unit; and
a secondary-side circuit electrically coupled to the secondary winding of the transformer unit and comprising a first output terminal and a second output terminal;
a third external pin electrically coupled to the first terminals of the first switch units of the power modules;
a fourth external pin electrically coupled to the second terminals of the second switch units of the power modules;
a fifth external pin electrically coupled to the first output terminals of the secondary-side circuits of the power modules; and a sixth external pin electrically coupled to the second output terminals of the secondary-side circuits of the power modules.

2. The power circuit of claim 1, wherein the first external pin of a first power module of the power modules is configured to be electrically coupled to the first external pin of a second power module of the power modules, the second external pin of the first power module is configured to be electrically coupled to the second external pin of the second power module.

3. The power circuit of claim 1, wherein the first external pin of a first power module of the power modules is configured to be electrically coupled to the third external pin, the second external pin of the first power module is configured to be electrically coupled to the fourth external pin, the first external pin of a second power module of the power modules is configured to be electrically coupled to the third external pin, the second external pin of the second power module is configured to be electrically coupled to the fourth external pin.

4. The power circuit of claim 1, wherein the first external pin of a first power module of the power modules is configured to be electrically coupled to the first external pin of a second power module of the power modules, the second external pin of the first power module is configured to be electrically coupled to the second external pin of the second power module;
the first external pin of a third power module of the power modules is configured to be electrically coupled to the first external pin of a fourth power module of the power modules, the second external pin of the third power module is configured to be electrically coupled to the second external pin of the fourth power module.

5. The power circuit of claim 1, wherein the first external pin and the second external pin of a first power module of the power modules, the first external pin and the second external pin of a second power module of the power modules, the first external pin and the second external pin of a third power module of the power modules are electrically coupled to one another.

6. The power circuit of claim 1, wherein each of the power modules further comprises:
an inductor unit electrically coupled between the second terminal of the primary winding of the transformer unit and the second node.

7. The power circuit of claim 1, wherein each of the power modules further comprises:
an inductor unit electrically coupled between the first terminal and the second terminal of the primary winding of the transformer unit.

8. The power circuit of claim 1, wherein each of the power modules further comprises:
a parallel capacitor unit electrically coupled between the first terminal and the second terminal of the primary winding of the transformer unit.

9. The power circuit of claim 1, wherein the secondary winding of the transformer unit comprises a first terminal and a second terminal;
the secondary-side circuit comprises a third switch unit, a fourth switch unit, a fifth switch unit, and a sixth switch unit;
wherein a first terminal of the third switch unit and a first terminal of the fifth switch unit are electrically coupled through the first output terminal, a second terminal of the fourth switch unit and a second terminal of the sixth switch unit are electrically coupled through the second output terminal, a second terminal of the third switch unit and a first terminal of the fourth switch unit are electrically coupled thorough the first terminal of the secondary winding, a second terminal of the fifth switch unit and a first terminal of the sixth switch unit are electrically coupled through the second terminal of the secondary winding.

10. The power circuit of claim 1, wherein the secondary winding of the transformer unit comprises a first terminal, a second terminal, and a third terminal;
the secondary-side circuit comprises a third switch unit and a fourth switch unit;
wherein a first terminal of the third switch unit is electrically coupled to the first terminal of the secondary winding, a first terminal of the fourth switch unit is electrically coupled to the second terminal of the secondary winding, a second terminal of the third switch unit and a second terminal of the fourth switch unit are electrically coupled through the second output terminal;
the third terminal of the secondary winding is electrically coupled to the first output terminal.

* * * * *